United States Patent [19]

Moore et al.

[11] 4,219,817
[45] Aug. 26, 1980

[54] PROTECTION DEVICE FOR PULSED RADAR

[75] Inventors: Loyd C. Moore, Arlington, Calif.; Klaus J. Hecker, Oberursel, Fed. Rep. of Germany

[73] Assignee: The United States of America as represented by the Secretary of the Navy, Washington, D.C.

[21] Appl. No.: 530,254

[22] Filed: Feb. 18, 1966

[51] Int. Cl.³ ............................................. G01S 7/28
[52] U.S. Cl. ......................................... 343/17.1 PF
[58] Field of Search ..................... 343/17.1 R, 17.1 PF

[56] References Cited

U.S. PATENT DOCUMENTS

| | | | |
|---|---|---|---|
| 2,671,896 | 3/1954 | DeRosa | 343/17.1 R |
| 2,700,156 | 1/1955 | Sunstein | 343/17.1 R X |
| 2,768,372 | 10/1956 | Green | 343/17.1 R X |
| 2,814,036 | 11/1957 | Philpott | 343/17.1 R X |
| 3,175,214 | 3/1965 | Ramsay et al. | 343/17.1 R X |
| 3,273,147 | 9/1966 | Herscovici | 343/17.1 R X |

Primary Examiner—T. H. Tubbesing
Attorney, Agent, or Firm—Richard S. Sciascia; Joseph M. St.Amand; Tom M. Phillips

[57] ABSTRACT

A protection device for a pulsed radar system which generates a random pulse train whose pulse spacing is kept between a predetermined maximum and minimum. A jitter coder alters the periodic timing of the clock pulses fed to the radar modulation circuit by means of a jitter code generated by a jitter code generator. The reflected radar signals are decoded in a decoding circuit using the jitter code generated by the jitter code generator.

1 Claim, 1 Drawing Figure

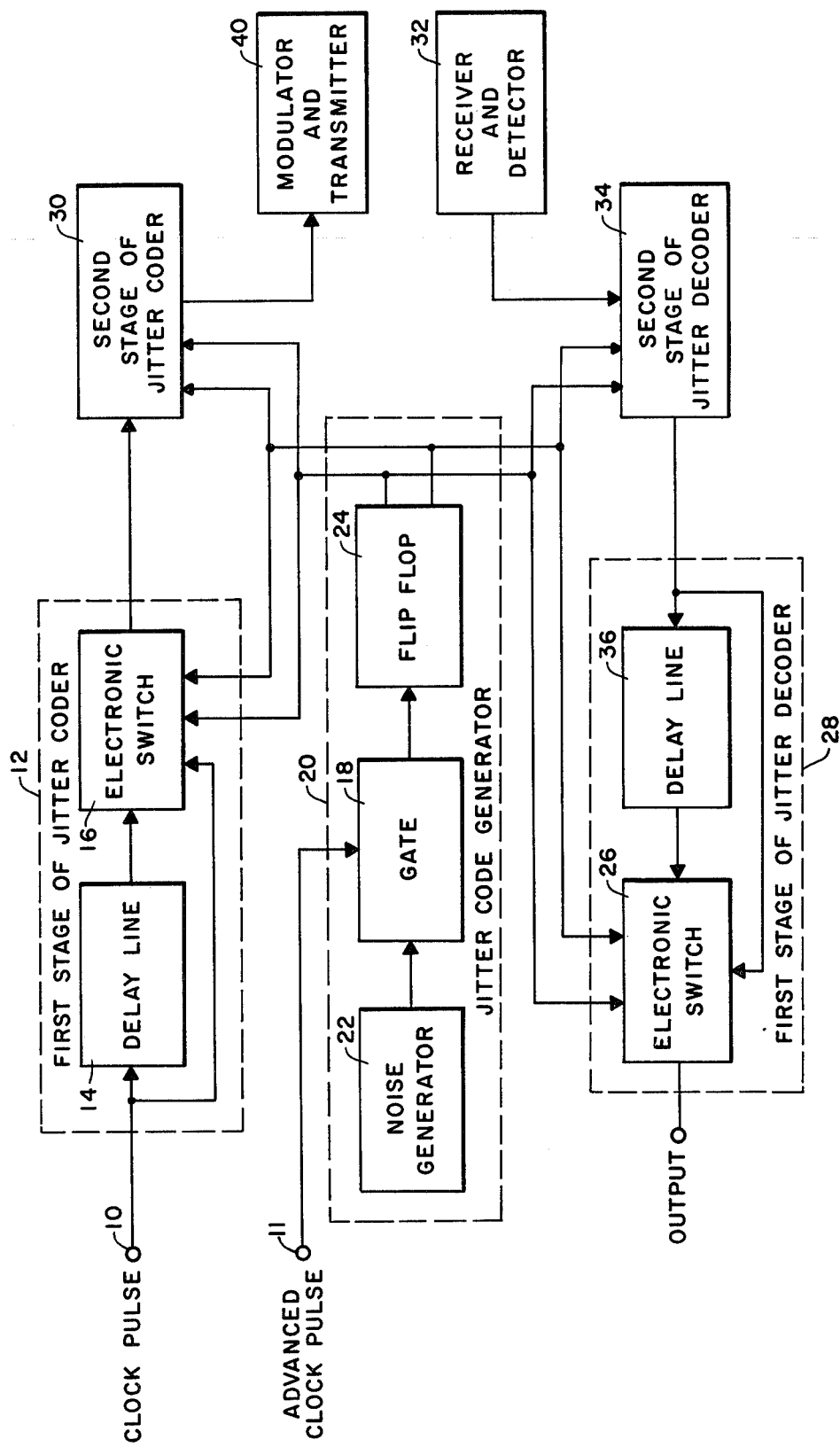

PROTECTION DEVICE FOR PULSED RADAR

The invention herein described may be manufactured and used by or for the Government of the United States of America for governmental purposes without the payment of any royalties thereon or therefor.

The present invention relates to protection devices for pulsed radars and more particularly to protection devices for pulsed radars wherein randomly changing the pulse repetition rate is accomplished while maintaining the pulse spacing between a maximum and minimum. Prior to the present invention it has been difficult to protect against attack by a missile homing on the radiation of the radar because it was not possible to generate a pulse train which had a sufficient amount of randomness and still maintain pulse spacing within an acceptable maximum and minimum. In addition, in some radar processing systems pulse jitter cannot be tolerated and it is necessary to de-jitter received pulses before they are fed to the processing system.

It is an object of the invention to provide a means to generate a random pulse train whose pulse spacing is kept between a predetermined maximum and minimum.

Another object of the invention is to provide a protective device, for the protection of radars against missile homing, which may be adapted to an already constructed radar system.

Other objects and many of the attendant advantages of this invention will be readily appreciated as the same becomes better understood by reference to the following detailed description when considered in connection with the accompanying drawings wherein there is shown in the single FIGURE a preferred embodiment of the invention.

Referring now to the drawing there is shown an input terminal 10 for receiving clock pulses from the radar master clock (not shown). The clock pulses received at terminal 10 are fed to the first stage of jitter coder 12 where they are either fed through delay line 14 or directly to electronic switch 16. Advance clock pulses received at terminal 11 (pulses which occur between clock pulses received at terminal 10) are fed as the gating pulses of gate circuit 18 of jitter code generator 20. Gate circuit 18 gates the output of noise generator 22 to flip flop multivibrator 24 which has two outputs coupled to the electronic switch 16 of the first stage of jitter coder 12 and to the electronic switch 26 of the first stage of jitter decoder 28. Depending on the state of the output from flip flop multivibrator 24 either the delayed clock pulse or the undelayed clock pulse will appear at the output of electronic switch 16 and is fed to the second stage of jitter coder 30.

In a similar manner, the return radar signal received in receiver and detector 32 are fed to the second stage of jitter decoder 34 where the signal is processed in the reverse manner as that of the signal processed in the jitter coder. The output signal from second stage of jitter decoder 34 is fed through delay line 36 and directly to electronic switch 26. In the corresponding stage of the jitter decoder, the received pulse will not be delayed or will be delayed, respectively depending on the state of flip-flop 24. The total delay through the jitter coder and decoder stage is always the same and is independent of the state of flip flop modulator 24.

There may be as many stages of the jitter coder and decoder as desired and they are identical to the first stage, i.e., each stage is controlled by the output from flip-flop 24; with the exception that corresponding delay lines have a delay different from the delays in any other stages. Typically the first stage will have one unit of delay, the second two units, the third four units of delay, etc.

Since advance clock pulses are received at terminal 11 between clock pulses received at terminal 10, gate circuit 18 is made conductive before a clock pulse appears at terminal 10. A pulse will appear at the output of gate circuit 18 whose amplitude is determined by the instantaneous voltage at the output of noise generator 22. This pulse may or may not be of sufficient amplitude to cause complementing of flip flop multivibrator 24. The next radar pulse may or may not be delayed with respect to the clock pulse at terminal 10. The output of the last stage of the jitter coder is fed to modulator and transmitter 40 and the pulse can appear at any of $2^x$ positions where x is the number of stages of the jitter coder. At the output of jitter decoder the pulse position will be determined by the range to the target. The time of transmission is controlled by flip-flop 24 which is also coupled to electronic switch 26 of the decoders. The time delay from the time of transmission to time of reception of a pulse is proportional to range.

If desired, the jitter decoder may be omitted and the output pulse is fed in addition to the modulator to the display unit where it starts the sweep of the display.

Obviously many modifications and variations of the present invention are possible in the light of the above teachings. It is therefore to be understood that within the scope of the appended claims the invention may be practiced otherwise than as specifically described.

What is claimed is:

1. In a protection device for a pulsed radar system wherein randomly changing the pulse repetition rate is accomplished while maintaining the pulse spacing between a maximum and minimum, the combination comprising:
   (a) jitter coder circuit means comprising
      (1) a first input terminal for receiving periodic clock pulses,
      (2) a first delay line having an input coupled to said first input terminal and having an output,
      (3) a first electronic switch having a first input coupled to the output of said first delay line, a second input coupled to said first input terminal, a third input and an output,
   (b) jitter code generating means comprising
      (1) a noise generator for generating noise signals,
      (2) a second input terminal for receiving periodic clock pulses occurring intermediate the clock pulses received at said first input terminal,
      (3) a gate circuit coupled to said noise generator and to said second input terminal and being responsive to pass noise generated signals in response to received clock pulses,
      (4) a flip flop multivibrator circuit coupled to said gate circuit and being responsive to noise signals of a predetermined amplitude to change its state of operation and having an output coupled to said third input of said first electronic switch,
   (c) modulator and transmitter means coupled to the output of said first electronic switch for transmitting pulsed radar signals,
   (d) receiver and detector means for receiving and detecting reflected radar signals,
   (e) jitter decoder circuit means comprising (1) a second delay line providing the same delay as said first delay line coupled to said receiver and detector means,
(2) second electronic switch means having a first input coupled directly to said receiver and detector, a second input coupled to the output of said second delay line, a third input coupled to the output of said flip flop multivibrator and being responsive to the output signals of said flip flop multivibrator for altering the timing of the received reflected radar signals in the same manner as the transmitted signal to produce an output signal having a time delay proportional to the range of the reflected radar signal.

* * * * *